United States Patent [19]

Cromley, Jr.

[11] Patent Number: 5,163,701
[45] Date of Patent: Nov. 17, 1992

[54] TORSION SPRING VEHICLE SUSPENSION
[75] Inventor: John D. Cromley, Jr., Grand Rapids, Mich.
[73] Assignee: CSN Manufacturing, Inc., Grand Rapids, Mich.
[21] Appl. No.: 756,493
[22] Filed: Sep. 9, 1991
[51] Int. Cl.$^5$ .............................................. B60G 3/00
[52] U.S. Cl. .................................. 280/700; 267/285; 280/723
[58] Field of Search .............. 280/664, 665, 689, 700, 280/717, 721, 723; 267/273, 285

[56] References Cited

U.S. PATENT DOCUMENTS

| | | |
|---|---|---|
| Re. 28,259 | 12/1974 | Henschen . |
| 1,338,556 | 4/1920 | Craig . |
| 1,480,663 | 1/1924 | Camporini . |
| 2,082,509 | 6/1937 | Rabe . |
| 2,149,374 | 3/1939 | Wellman . |
| 2,160,373 | 8/1939 | Porsche . |
| 2,163,131 | 6/1939 | Prosche . |
| 2,169,850 | 8/1939 | Rabe . |
| 2,662,236 | 12/1953 | Kester . |
| 2,779,602 | 1/1957 | Kimbro et al. . |
| 2,942,871 | 6/1960 | Kraus .................. 267/273 |
| 3,047,283 | 7/1962 | Kivell . |
| 3,071,366 | 1/1963 | Loehr .................. 267/273 |
| 3,081,991 | 3/1963 | Swainson . |
| 3,207,497 | 9/1965 | Schoonover ......................... 280/723 |
| 3,330,558 | 7/1967 | Simons, Jr. .................. 272/68 |
| 3,625,545 | 12/1971 | Somers et al. ...................... 280/400 |
| 3,687,479 | 8/1972 | Kober . |
| 3,844,583 | 10/1974 | Sakow et al. . |
| 4,194,761 | 3/1980 | Falk et al. .............. 280/705 |
| 4,470,616 | 9/1984 | Kaneko et al. ...................... 280/721 |
| 4,521,033 | 6/1985 | Lenhard-Backhaus et al. ... 280/700 |
| 4,544,180 | 10/1985 | Maru et al. .............................. 280/689 |
| 4,580,808 | 4/1986 | Smith-Williams ................... 280/700 |
| 4,596,401 | 6/1986 | Jullien .................. 280/700 |
| 4,637,628 | 1/1987 | Perkins .............................. 280/689 |
| 4,723,790 | 2/1988 | Wharton ............................ 280/700 |
| 4,744,588 | 5/1988 | Wharton ............................ 280/700 |
| 4,917,402 | 4/1990 | Reynolds et al. ................... 280/700 |

FOREIGN PATENT DOCUMENTS 881390 4/1943 France .
967306 10/1950 France .

OTHER PUBLICATIONS

Product brochure of rubber torsion axles published by Reliable Tool & Machine Co., Inc., Kendallville, Ind.

Primary Examiner—Kenneth R. Rice
Attorney, Agent, or Firm—Price, Heneveld, Cooper, DeWitt & Litton

[57] ABSTRACT

A torsion spring cartridge is provided for torsionally absorbing loads on a trailer frame or the like. The torsion spring cartridge is insertable into an axle tube and includes a counter torque hub, a bearing block spaced therefrom, and a torque shaft mounted for oscillating rotational movement in the bearing block with torsion rods operably interconnected between the counter torque hub and the torque shaft. The bearing block and the torque shaft each include over-rotation stops that cooperate to prevent over-rotation of the torque shaft during use. The bearing block supports the inside of the axle tube to prevent distortion of the axle tube profile during over-torquing of the torque shaft during use, and a frame bracket supports the outside of the axle tube and transmits forces from the bearing block and axle tube directly to the trailer frame. The torsion rods have ends with substantially circular cross-sections, and are held in place by brazing. Oven brazing is utilized to equalize stress and minimize stress risers in the brazed joint so that the resulting brazing bonds resist stress fractures and failure from cyclical loading of the torsion spring cartridge.

23 Claims, 2 Drawing Sheets

TORSION SPRING VEHICLE SUSPENSION

BACKGROUND OF THE INVENTION

The present invention relates to torsion spring suspensions for trailers, vehicles, and the like, and in particular to a torsion spring suspension having a replaceable torsion element cartridge.

Torsion spring suspensions offer an attractive alternative to leaf spring suspensions and solid axles since torsion spring suspensions typically offer improved handling, a smoother ride, and a lower center of gravity. However, torsion spring assemblies tend to be more costly due to the specialized parts and equipment required to manufacture them. Further, the specialized parts and equipment can lead to product inconsistency and warranty problems.

Some torsion spring assemblies utilize rubber as the torsional stress absorber However, rubber is sensitive to temperature changes, and hence, the torsion spring assembly load ratings and spring rates of such torsion spring assemblies may vary significantly with temperature. Further, such rubber suspension, can be difficult to assemble consistently since the rubber components must typically be frozen first to reduce their size by contraction. Still further, once the rubber is assembled into the torsion spring assembly, clips and brackets cannot be welded to the outer cartridge or axle tube of the assembly and the latter cannot be mounted by welding since high weld temperatures will damage the rubber. Also, such axle assemblies tend to be very heavy due to the extensive amount of high-durometer rubber they use.

Still other torsion spring assemblies utilize metal or other torsion bars instead of rubber. These assemblies typically require use of a motion limiter to control over-rotation or over-torquing of the torsion springs. However, present motion limiters transmit the overstress condition to the torsion spring axle tube in a way that causes the axle tube to prematurely fail. For example, the motion limiter is often a polygonally shaped plate that rotates in the axle tube, pressing outwardly on the flat sides of the axle tube during over-torquing of the torsion spring assembly and potentially causing the cross-sectional profile of the axle tube to plastically deform. When this happens, the limiter may well fail, and a completely new axle tube is required to repair the suspension. Further, with the axle tube damaged, internal parts cannot be readily removed and reused, hence requiring that substantially all of the major parts be discarded and a new torsion spring assembly be installed.

Thus, there is a need for a torsion spring assembly that requires less specialized parts and less specialized machinery to assemble, and which distributes stress in a manner reducing the tendency to plastically deform parts during overload and over-rotation conditions. Furthermore, there is a pronounced need for a torsion spring axle assembly having a safe and completely reliable motion limiter which will operate repeatedly without damaging the assembly or impairing its ability to function properly.

SUMMARY OF THE INVENTION

In one aspect, the present invention comprises a torsion spring cartridge including a bearing block that mateably fits within an axle tube, and a torque shaft that mateably fits within an inner bore on the bearing block for oscillating rotational movement therein. Torsion rods are operably connected to the torque shaft such that rotational movement of the latter causes the torsion rods to transmit a counterbalancing torque. The torque shaft includes a torque limiter that engages the bearing block to prevent over-rotation of the torque shaft when the torque shaft is moved by suspension loading to a maximum desired angle from the nominal, unloaded position. The bearing block is mounted so that forces from over-torquing are transmitted to the trailer frame without causing the torsion spring elements to over-rotate and suffer or cause plastically deformation.

In yet another aspect, the present invention provides a counter torque hub and torque shaft with torsion rods extending therebetween. The torsion rods are preferably of circular cross section and include ends of circular cross-section that extend into apertures in the counter torque hub and torque shaft, and are operably held in place by brazing. In the preferred embodiment, the brazing is done by oven brazing to optimize bonding and uniformity while minimizing stress concentration.

In another aspect, the present invention provides a method of installing a torsion spring cartridge including the steps of providing a torsion spring cartridge, inserting the torsion spring cartridge into an axle tube, and supporting the profile of the axle tube to prevent deformation during over-torquing of the torsion spring cartridge. Supporting the profile of the axle tube facilitates later removal of the torsion spring cartridge from the axle tube, and subsequent replacement or reuse of the cartridge.

The invention offers several advantages over existing art. Initially, the torsional spring cartridges of the present invention have a built-in safety feature allowing the torque arms to rotate only until contacting a positive stop. The stop is constructed to minimize the stress transmitted to the axle tube from over-torquing of the torsional components, thus greatly reducing the tendency to plastically deform the axle tube. Also, the stops allow the system to function as an axle even if the torsion rods fail. Thus, the vehicle can continue on to its destination safely without being stranded or leaving the trailer behind. Further, in the case of failure, the failure mode tends to be less serious and less severe than known existing designs, thereby reducing the chance of accident or the like.

Further, the invention promotes repairability. For example, on failure of the torsion rods, the axle tube is less likely to be plastically deformed. Therefore, the torsion spring cartridge can be readily replaced by simply removing several bolts, sliding the cartridge out, replacing it with a new cartridge, and then rebolting. Still further, the suspension according to the present invention is substantially unaffected by ambient temperatures because of the non-rubber construction. Also, less specialized parts and processes are utilized due to non-use of rubber, and also due to the simplified torsion rod design and method of retention.

These and other features, advantages and objects of the present invention will be further understood and appreciated by those skilled in the art by reference to the following specification, claims and appended drawings

DETAILED DESCRIPTION OF THE PREFERRED EMBODIMENTS

Figure 1:
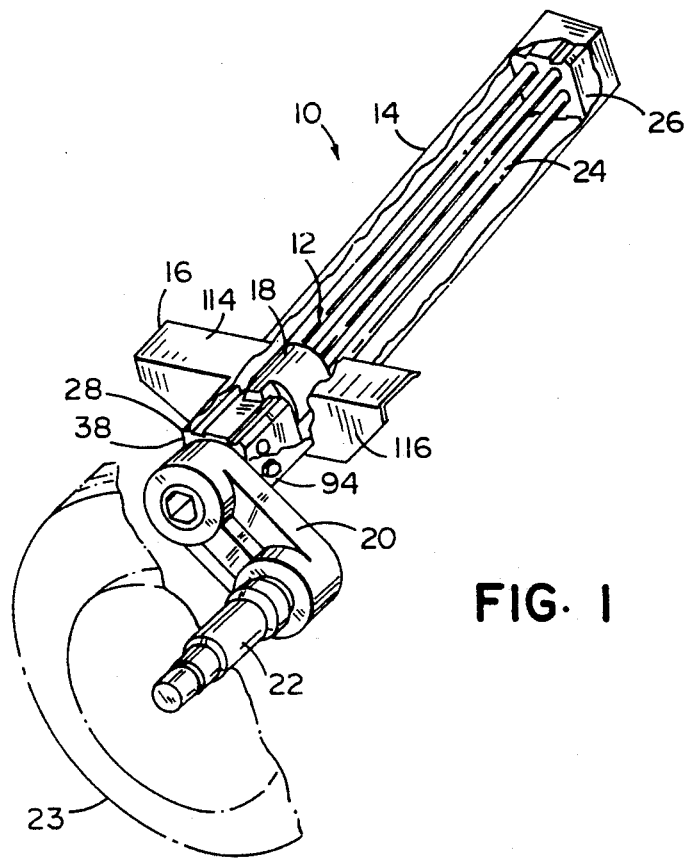
FIG. 1 is a broken-away perspective of the torsion spring cartridge embodying the present invention as installed.

A torsion spring assembly 10 (FIG. 1) embodying the present invention is provided for torsionally absorbing axle suspension loads on a wheeled frame or the like such as on a trailer frame, recreational vehicle, or house trailer, although assembly 10 could be used anywhere it is desirable to suspensionally support a load. Torsion spring assembly 10 includes a torsion spring cartridge 12 that is insertable into an outer tube 14 attached to the wheeled frame (not shown) and secured thereto by frame bracket or mounting bracket 16. Torsion spring cartridge 12 includes an axially extending torque shaft 18 that is rotatably mounted in a bearing block 28 of cartridge 12 and which mechanically serially supports a torque arm 20, an offset-mounted spindle 22, and a wheel assembly 23.

As wheel assembly 23 encounters a typical road bump or otherwise experiences small unbalanced forces, the force and motion are torsionally transmitted through spindle 22 and torque arm 20 to torque shaft 18 and the internal components of torsion spring cartridge 12. Torsion spring cartridge 12 includes torsion rods 24 operably connected between a counter torque hub 26 and torque shaft 18, allowing cartridge 12 to torsionally elastically resist the rotational movement of torque shaft 18. Counter-torque hub 26 transmits the resulting stress to axle tube 14, frame bracket 16, and the vehicle frame.

If wheel assembly 23 encounters a large bump or otherwise experiences a large unbalanced force, stops on torque shaft 18 and bearing block 28 engage to prevent over-rotation of spindle 22. The resulting over-torque stress is then transmitted from spindle 22 directly to bearing block 28 and through axle tube 14 to bracket 16, bracket 16 supporting axle tube 14 in the high-stress area. Thus, stress is transferred directly to the trailer frame and does not result in distortion of the profile of axle tube 14.

In the present invention, torque shaft 18 is movably supported by a bearing block 28 for oscillating rotational movement therein. Additionally and importantly, torque shaft 18 and bearing block 28 form a torque limiter or over-rotation engagement means that resist the over-rotation or over-torquing of torque shaft 18 in cartridge 12. By supporting the inside and outside of axle tube 14 at bearing block 28, forces from the engagement of the torque limiter can be transmitted to frame bracket 16 and the wheeled frame without premature failure of axle tube 14.

Figure 2:
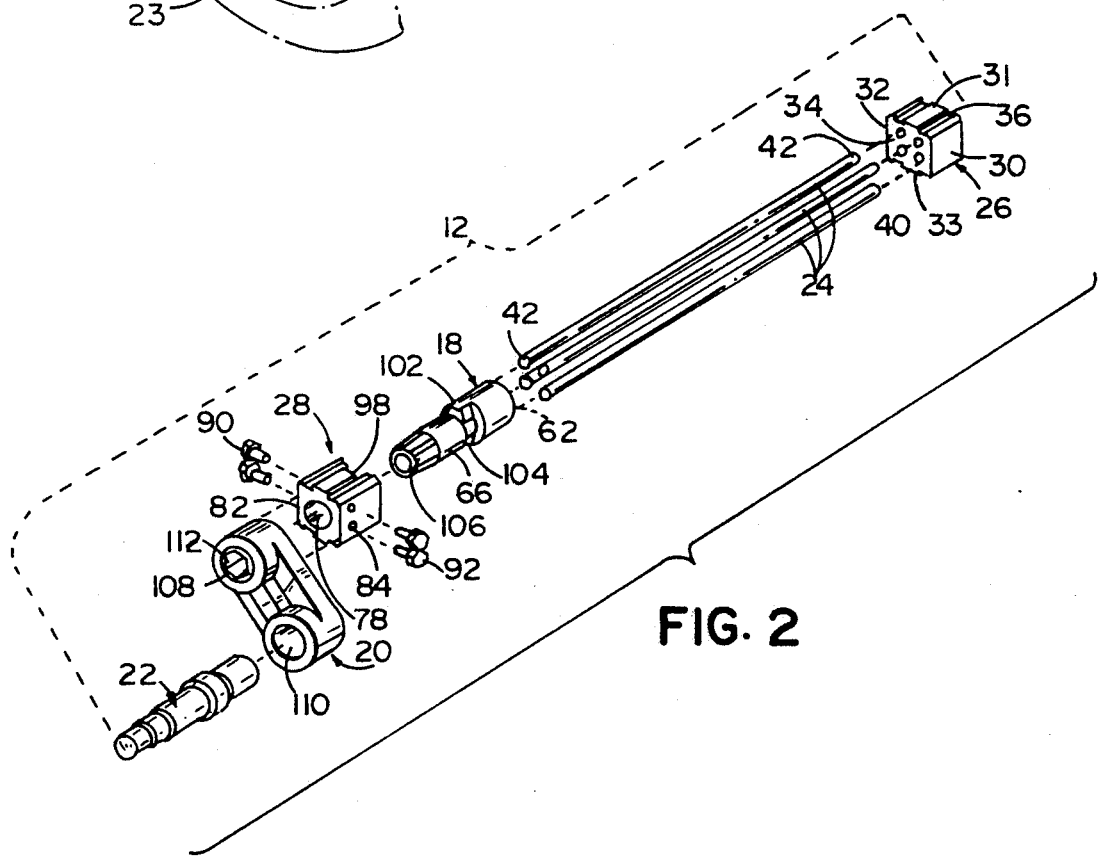
FIG. 2 is an exploded perspective of FIG. 1.

As noted, torsion spring cartridge 12 includes counter-torque hub 26 (FIG. 2). Hub 26 is substantially a rectangular solid defining sides 30, 31, 32, and 33 and face 34, with sides 30-33 being shaped to mateably slideably fit within the inside of axle tube 14. Thus, counter-torque hub 26 is securely held by axle tube 14 and cannot rotate therein. Sides 30-33 include multiple notches 36 that reduce weight, facilitate manufacture, and facilitate the slideable installation of hub 26 into axle tube 14 by reducing potential interference with the inner surface of axle tube 14 during installation through the open end 38 of axle tube 14 (FIG. 1). However, notches 38 do not cut into the corners of hub 26 and thereby do not reduce the ability of axle tube 14 to prevent the rotational movement of hub 26 within axle tube 14. Face 34 of hub 26 includes a plurality of torsion rod apertures or holes 40 for receiving torsion rods 24, the number and diameter of which will vary depending on the load to be carried. A matching set of torsion rod apertures 62 are located on the rearwardly-directed face of torque shaft 18.

Figure 5:
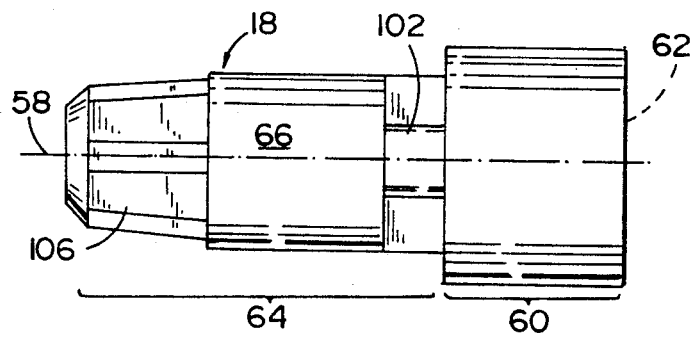
FIG. 5 is a side view of the torque shaft.
Figure 6:
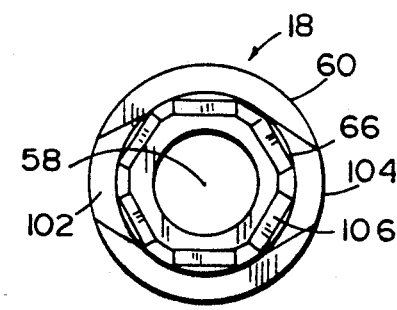
FIG. 6 is an end view of FIG. 5.

Torque shaft 18 (FIGS. 5 and 6) is a generally cylindrically shaped part and defines a central axis 58 that extends parallel with torsion rods 24. Torque shaft 18 has an enlarged inner portion 60 with inwardly facing torque rod apertures 62. Apertures 62 are identical to apertures 40 in counter-torque hub 26, and similarly receive and are secured by brazing to ends 42 of torsion rods 24. Thus, torque shaft 18 is rigidly operably interconnected to counter-torque hub 26 by multiple torsion rods 24. Torque shaft 18 further has an outer portion 64 having a reduced diameter, a part of which defines a bearing surface 66.

In the present invention, torsion rods 24 have a continuous circular cross-section the full length thereof and may advantageously comprise spring steel rod stock. By utilizing such round torsion rods 24 with round ends 42 and correspondingly round or circular apertures 40 and 62 in the torque shaft 18 and counter-torque hub 26, the manufacture of torsion the suspension and the subsequent assembly thereof is simplified and made much less expensive Thus, the machinery and processes needed to form and assemble the associated parts are much less specialized, as are the raw materials.

Persons skilled in the art have resisted utilizing torsion rods 24 with ends 42 having circular or round cross-sections, since such an arrangement was considered too difficult and/or too expensive to manufacture due to the problem of reliably but economically retaining the circular cross-section rods in their circular receiving holes. Thus, such a structure was considered unlikely to be commercially feasible as well as unlikely to meet the stress loading and durability requirements necessary for torsion rods. Persons skilled in the art have also resisted utilizing welding in this application, being of the opinion that the resultant bond would be inconsistent and not sufficiently reliable, uniform, and defect-free, as well as creating undesirable areas of stress concentration in actual use. So far as is known, brazing was not even considered heretofore, probably because it is not typically used in any such application and thought to produce comparatively weak bonds. However, my testing has shown that brazing can provide sufficient bonding in the present inventive arrangement where the brazing is sufficiently uniformly distributed so as to optimize surface contact and uniformity, while minimizing localized stress and stress risers. Further, it has been found that oven brazing satisfies these requirements. Previously, persons skilled in the art would typically not have thought of utilizing oven brazing in this application because of the general opinion that the temperature required in oven brazing would cause the torsion rods to lose their dimensional integrity (i.e. warp by stress-relieving at the oven temperature) and also lose a part of their torsional strength. However, by capturing both ends of the torsion rods 24 in torque shaft 18 and hub 26, loss of dimensional integrity has not been a problem. Also, by making torsion rods out of standard 9160 steel or like material, cost is minimized while torsional strength is maintained through the oven brazing process.

Figure 7:
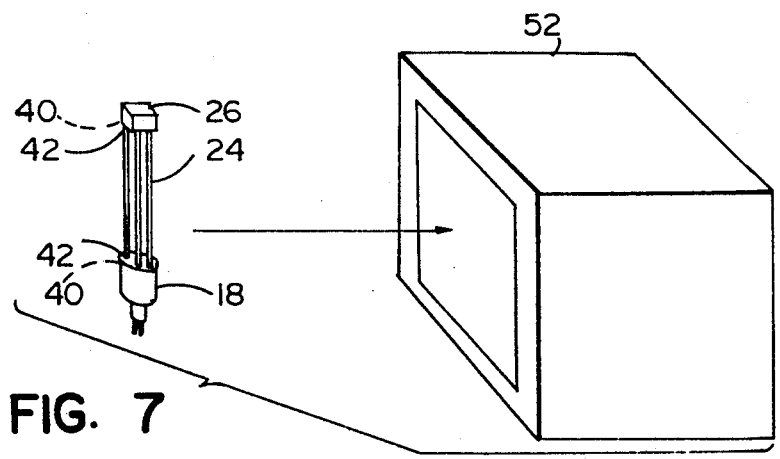
FIG. 7 is a schematic showing an oven brazing process.

In the illustrated embodiment, the brazing is accomplished by oven brazing (FIG. 7) wherein one or more rings of brazing material (not shown) is placed within aperture 40 of counter-torque hub 26 and aperture 62 of torque shaft 18, and ends 42 of torsion rod 24 are then placed therein. The assembly is then heated to about 2000° F. in an oven 52 so that the rings of brazing material melt, causing the brazing material to fully coat and interconnect (bond) ends 42 of torsion rods 24 within apertures 40 and 62. Importantly, the brazing material becomes uniformly distributed between the surfaces of end 42 and their receiving apertures 40 (and 62) to fill voids therebetween. By the brazing ring being located within apertures 40 (and 62) and then being forced or drawn outwardly, entrapment of air and other stress risers is minimized. Also, due to the substantially uniform heating of parts within oven 52 and the substantially uniform cooling thereafter, localized stress within the brazing material itself is minimized. Testing has shown that cooling is best done by a forced air system that reduces the part temperatures to about 600°–800° F. in about 4 minutes or longer. Faster cooling rates tend to cause surface stresses that may degrade the joint strength. After cooling, it is contemplated that the joint could be tempered at about 1500° F. for a sufficient period, or otherwise stress-relieved or treated as required to minimize stress. However, testing to date has shown that tempering is not necessary for optimum performance, and in fact may be undesirable depending upon the effect of the 1500° F. temperature on the properties of rods 24 and other parts.

When utilizing torsion rods 24 with round ends 42, it has been found that the torsion strength of the brazed joint increases when the thickness of the braze is kept to a minimum (i.e. the clearance between rod end 42 and aperture 40 is minimized). Brazing material thicknesses of about 5 thousandths of an inch are believed to be optimal. Braze thicknesses of up to 20 to 30 thousandths could be utilized, but it is believed that brazed joints of that thickness would tend to develop air pockets and other stress-risers that would degrade the strength of the joint. Braze thicknesses of less than 5 thousandths are not believed to be practical due to the out-of-roundness of ends 42 and holes 40 (and 62) which results in material interference between rods 24 and hub 26 (and torque shaft 18).

Figure 3:
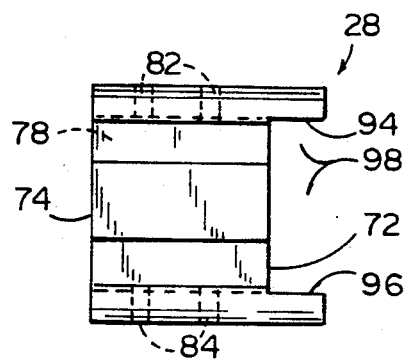
FIG. 3 is a side view of the bearing block.
Figure 4:
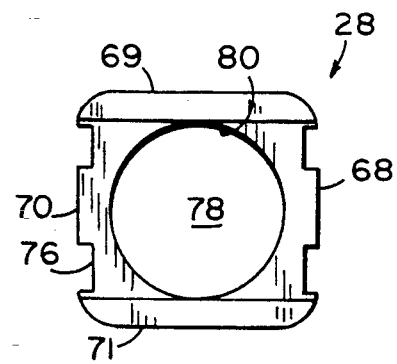
FIG. 4 is an end view of FIG. 3.

Torsion spring cartridge 12 also includes a bearing block 28 (FIGS. 3 and 4) that is substantially a rectangular solid mass defining sides 68, 69, 70, and 71, inner face 72, and outer face 74, with sides 68–71 being shaped to mateably slideably fit within the inside of axle tube 14. Thus, bearing block 28 is securely held by axle tube 14 and cannot rotate therein Sides 68–71 include multiple notches 76 that reduce weight, facilitate manufacture, and facilitate the slideable installation of bearing block 28 into axle tube 14 by reducing the likelihood of interference with the inner surface of axle tube 14 during installation through the open end 38 of axle tube 14. However, notches 76 do not cut into the corners of bearing block 28 and thereby do not reduce the ability of axle tube 14 to prevent rotational movement of bearing block 28 within axle tube 14. Additionally, bearing block 28 has a cross-sectional profile that substantially fills the inside of axle tube 14, thereby preventing distortion to the cross-sectional profile of axle tube 14 during over-torquing of torsion spring cartridge 12 as discussed below.

Bearing block 28 includes a centrally positioned inner bore 78 with a bearing surface 80 sized to receive bearing surface 66 of torque shaft 18 for free oscillating rotational movement thereon. Bearing surface 80 can be any of a number of different designs such as one which retains grease on surface 80, or one that has lubrication impregnated therein.

Sides 69 and 71 of bearing block 28 include threaded attachment holes 82 and 84 that align with corresponding attachment holes in axle tube 14. Attachment bolts 90, 92 are placed through the attachment holes in axle tube 14 and are threadably installed into holes 82 and 84 to retain bearing block 28 (and thereby the torsion spring cartridge 12) in place within axle tube 14.

Inner face 72 (FIG. 3) of bearing block 28 includes torque limiter shoulders or safety stops 94 and 96 with torque limiter opening 98 located therebetween. Torque shaft 18 includes corresponding shoulders or safety stops 102 and 104. Stops 102 and 104 extend outwardly from outer portion 64 and integrally connect with enlarged inner portion 60. Stops 102 and 104 are essentially opposing protrusions that mateably fit within opening 98 of bearing block 28. Stops 102 and 104 and opening 98 are sized to allow torque shaft 18 to rotate a desired angular amount representing a desired maximum torque imposed on the torsion components before engagement of stops 102 and 104 with stops 94 and 96.

The outer end of outer portion 64 of torque shaft 18 includes a shaped end 106 (FIG. 2) which is preferably of tapered, angularly-faced (e.g., hexagonal) configuration. Torque arm 20 includes two parallel bores 108 and 110. Bore 108 defines a central axis that extends through torque arm 20, bore 108 including shaped inner surfaces 112 that complement and matingly receive and engage shaped end 106 of torque shaft 18 to preclude relative rotation therebetween. Permanent retention and securement of these components in the relation just noted may be accomplished by swedging or welding, or by providing a threaded end extremity on shaped end 106 which receive a mechanical fastener such as a nut. A spindle or foreshortened axle 22 is installed in bore 110 of torque arm 20. Spindle 22 provides means for rotatably mounting wheel assembly 23 thereto. Thus, as wheel 23 experiences a bump or other unbalanced forces, such forces are torsionally transmitted through spindle 22 and torque arm 20 to torque shaft 18. Torque shaft 18 oscillatingly rotates against stabilizing forces generated by torsion rods 24 and counter-torque hub 26, which in turn transmit the resulting forces to axle tube 14, mounting bracket 16 and the trailer frame (not shown).

Mounting bracket 16 can have a number of different shapes, but in the preferred embodiment has an upper flat surface 114 which may be welded to the trailer frame, and a downward web 116 that supports axle tube 14 on three sides at bearing block 28. Bracket 16 and axle tube 14 can be welded or attached to the trailer frame as structural members to provide additional rigidity thereto.

OPERATION

Having described the components and interrelationship thereof, the use and operation of the present invention will likely be clear to one skilled in the art. Initially, torsion rods 24 are brazed (i.e., "brazingly secured") to torque shaft 18 and counter-torque hub 26, within torsion rod apertures 40 and 62. It is contemplated that oven brazing will preferably be utilized to optimize the interconnection of torsion rods 24 to torque shaft 18 and 26, as previously discussed. The outer reduced diameter portion 64 of torque shaft 18 is then inserted through inner bore 78 of bearing block 28, and shaped end 106 of torque shaft 18 is installed securely within bore 108 of torque arm 20. A spindle 22 is then installed in second bore 110 of torque arm 20, spindle 22 constructed so that a wheel assembly 23 can be later installed onto spindle 22.

A trailer frame or the like is provided with an axle tube 14 securely mounted to the trailer frame. Axle tube 14 can be welded or otherwise attached to the trailer frame such as by use of mounting bracket 16. The mounting bracket 16 shown supports the outer profile of axle tube 14 on three sides to assist in transfer of loads from bearing block 28 through axle tube 14 to the trailer frame. Torsion spring cartridge 12 (including parts 18, 20, 22, 24, 26, and 28) is slideably installed through open end 38 of axle tube 14 and inside thereof. Torsion spring cartridge 12 is then secured in place by use of bolts 90 and 92 which extend through holes in axle tube 14 and are threaded into attachment holes 82 and 84 in bearing block 28. Wheel assembly 23 is then mounted to spindle 22. As will be understood, wheel assembly 23 may include a hub and brake mechanism (not shown) such as is useful for larger trailers and recreational vehicles or the like.

With torsion spring cartridge 12 fully installed within axle tube 14 and secured thereto, a torsion spring assembly 10 is thus provided which is fully operational. As the vehicle is moved, road bumps and the like are encountered which force wheel assembly 23 upwardly. This in turn causes torque arm 20 to rotate, and in turn causes torque shaft 18 to rotate against the counterbalancing torsional spring forces of torsion rods 24. This torsional oscillatingly rotating movement is transmitted through counter torque hub 26 to axle tube 14 and in turn through mounting brackets such as mounting bracket 16 to the trailer frame.

When a particularly severe bump or hole is encountered, excessive motion and force is transmitted through torque arm 20 to torque shaft 18. To prevent this from over-torquing torsion rods 24 and possibly breaking or plastically deforming the torsion rods 24 or axle tube 14, safety stops 102, 104, 94, and 96 engage. The stress from such over-torque or over-rotation condition is thereby transmitted from torque shaft 18 through safety stops 102, 104, 94 and 96 directly to bearing block 28. Since bearing block 28 is a substantially solid steel piece having sidewalls which are thick and strong compared to axle tube 14, the bearing block 28 will readily withstand such forces without distorting. Also, since bearing block 28 fills the inner hollow profile of axle tube 14 and is held tightly against or adjacent the vehicle frame, axle tube 14 is not significantly distorted by such force. That is, mounting bracket 16 which attaches to axle tube 14 adjacent bearing block 28 supports three or more sides of the outside of axle tube 14, and thus transmits the stress from the over-torque condition directly to the trailer frame, thereby greatly reducing any tendency to allow rotation of bearing block 28 which would plastically deform the axle tube 14. Stops 102, 104, 94, and 96 thus act to positively limit conditions which would impair functioning of the axle suspension, allowing the operator to continue to his/her destination, even if failure of the torsion rods 24 should occur. Further, cartridge 12 can be readily replaced or reused since the axle tube 14 is not plastically deformed.

Thus, a torsional spring assembly is provided with a torsional spring cartridge that is readily manufacturable, includes a reduced number of specialized parts, and provides a positive-stop over-torque limiter to minimize damage from excessive torque applied thereto. Premature damage to the axle tube is thus minimized. Also, the positive stop allows the system to function as an axle even if the torsion rods fail, thus allowing operators to continue on to their destination safely without being stranded or leaving the trailer behind. Further, due to the reduced tendency toward plastic deformation, torsional spring cartridge 12 is more readily replaceable and removable for later reuse.

In the foregoing description, it will be readily appreciated by those skilled in the art that modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows.

1. A torsion spring cartridge for use in an axle tube adapted to be mounted on a trailer frame or the like, comprising:
   a counter torque hub shaped to mateably fit within the axle tube and including a first set of torsion rod apertures;
   a bearing block shaped to mateably fit within the axle tube in a position spaced from said counter torque hub, said bearing block including a second set of torsion rod apertures and an inner bore and further including a cross-section that substantially fills a cross-sectional interior portion of said axle tube to prevent distortion of said axle tube when said bearing block experiences torque while installed therein;
   a torque shaft including a portion shaped to mateably fit within said inner bore of said bearing block for rotational movement therein, said torque shaft further including positive stop torque-limiter means for engaging corresponding portions of said bearing block to prevent over-rotation of said torque shaft relative to said bearing block;
   a plurality of torsion rods each having first and second ends that are inserted into said first and second set of torsion rod apertures, respectively;
   means for non-rotatably securing said torsion rods in said first and second set of torsion rod apertures; and
   a torque arm mounted on said first portion of said torque shaft, said torque arm including means for mounting a trailer wheel thereto;
   whereby, when said torque shaft is over-torqued the force thereof is transferred through said positive stop torque-limiter means and said corresponding portions to said bearing block, such that said axle tube remains undeformed by said force and said torsional cartridge can be readily removed and replaced after the over-torque condition.

2. The apparatus as defined in claim 1 wherein said bearing block includes a first over-rotation stop; and
   said torque shaft includes a second over-rotation stop, said second stop on said torque shaft being radially spaced from said first stop on said bearing block when said torsion spring cartridge is installed in said axle tube and the trailer or the like is in a rest position, said torque shaft being rotatable so that said first and second stops contact one another and prevent over-rotation of said torque shaft when said torque shaft is rotated through a maximum desired angle from said rest position; whereby said first and second stops limit the torque that can be applied to the torsion rods and also limit the rotation of said torque shaft relative to said torsion spring cartridge.

3. The apparatus as defined in claim 2 including means for mounting said bearing block to the trailer frame so that torsional forces from over-torquing of said torque shaft are transmitted to the trailer frame without causing said bearing block to over-rotate relative to said axle tube and plastically deform said tube.

4. The apparatus as defined in claim 3 wherein said bearing block substantially fills said axle tube along a predetermined longitudinal portion thereof whose extent provides an overall load-bearing surface of sufficient size to prevent distortion of the profile of said axle tube during said over-torquing of said torque shaft.

5. The apparatus as defined in claim 4 including a frame bracket that reinforces the profile of said axle tube at said bearing block.

6. The apparatus as set forth in claim 5 wherein said bearing block is coupled to said frame bracket.

7. The apparatus as set forth in claim 1 wherein said ends of said torsion rods have a circular cross-sectional shape, and said ends are held in place by brazing.

8. The apparatus as set forth in claim 7 wherein said brazing comprises oven brazing.

9. The apparatus as set forth in claim 1 wherein said bearing block and axle tube are configured and relatively dispose such that said bearing block is located adjacent a frame bracket.

10. In a torsion spring cartridge adapted for use in an axle tube on a vehicle, of the type having:
a counter torque hub shaped to fit within the axle tube and including a first set of torsion rod-receiving apertures;
a bearing block interfitted with the axle tube in a position spaced from said counter-torque hub, said bearing block including a bore defining a journal and a first set of torsion rod apertures;
a torque shaft including a first and second portion, said first portion journaled to within said bore of said bearing block for rotational movement therein, said second portion including a second set of torsion rod-receiving apertures; and
a plurality of torsion rods having ends of substantially circular cross-section, each of said ends extending into a corresponding one of said first and second set of torsion rod apertures;
the improvement comprising means for preventing the rotation of said torsion rod ends in their respective said first and second torsion rod-receiving apertures, said means including a brazing connection between said torsion rod ends and their corresponding first and second torsion rod apertures;
whereby said torsion rods are non-rotatably interconnected between said counter torque hub and said torque shaft so as to transmit torsional forces therebetween.

11. The apparatus as set forth in claim 10 wherein said brazing connection comprises oven brazing.

12. The apparatus as set forth in claim 11 wherein said brazing connection comprises brazing material having a thickness of less than about 20 to 30 thousands of an inch.

13. The apparatus as set forth in claim 12 wherein said brazing material thickness is about 5 thousands of an inch.

14. The apparatus as set forth in claim 13 wherein said brazing material is tempered.

15. A process for retaining the ends of torsion rods in a torsion spring device of the type having a counter-torque hub with torsion rod apertures, and a torque shaft with corresponding torsion rod apertures; and a plurality of torsion rods having ends with circular cross-sections, said ends of said torsion rods disposed in said torsion rod apertures;
said process comprising the steps of:
brazing said torsion rods to said counter torque hub and to said torque shaft by applying molten brazing material therebetween and then cooling said brazing material to solidify said brazing material in place and thereby create an adheringly bond between said circular cross-sections of said torsion rod ends and said center torque hub and said torque shaft, said brazing being done in a manner that equalizes stress so that the brazing material and resulting bonds resist stress fractures and failures, permitting said torsion rods to act as torsion springs in said torsion spring cartridge.

16. The process as defined in claim 15 wherein said brazing is accomplished by oven brazing.

17. The process as defined in claim 16 wherein said brazing is carried out at a temperature of about 2000 F.

18. The process as defined in claim 16 including the step of tempering said brazing material.

19. A method of mounting a torsion spring apparatus in an axle tube on a vehicle frame or the like so as to minimize distortion and damage to the axle tube upon over-torquing of the torsion spring apparatus, including the steps of:
configuring said torsion spring apparatus so that it will mateably slide within said axle tube, and including a torque-limiter with positive stops as part of said torsion spring apparatus, said torque-limiter adapted to prevent over-torquing of said torsion spring apparatus during use by direct engagement of said positive stops;
inserting said torsion spring apparatus into said axle tube; and
supporting the profile of said axle tube at said torque-limiter to prevent deformation of said profile from torsional stress created at said torque-limiter due to over-torquing of said torsion spring apparatus during use;
whereby the profile of said axle tube is retained and not distorted during over-torquing and said torsion spring apparatus can thereby be integrally removed as a replaceable cartridge after such over-torquing.

20. The method as defined in claim 19 wherein said step of supporting includes the use of a preimetral support inside said axle tube.

21. The method as defined in claim 19 wherein said step of supporting includes the use of a perimetral support outside of and around at least portions of said axle tube.

22. The method as defined in claim 19 including the further step of removing said torsion spring apparatus as a replaceable cartridge after over-torquing of said torsion spring apparatus.

23. The method as defined in claim 19 including the step of providing said torsion spring apparatus as an assembled replaceable cartridge.

* * * * *

UNITED STATES PATENT AND TRADEMARK OFFICE
CERTIFICATE OF CORRECTION

PATENT NO. : 5,163,701

DATED : November 17, 1992

INVENTOR(S) : John D. Cromley, Jr.

It is certified that error appears in the above-identified patent and that said Letters Patent is hereby corrected as shown below:

Column 1, line 19
  After "absorber" insert -- . --.

Column 4, line 31
  After "expensive" insert -- . --.

Column 5, line 56
  After "therein" insert -- . --.

Column 8, lines 33 -
  After "including" delete "a second set of torsion rod apertures and".

Column 8, line 40
  After "including a" insert -- first --.

Column 8, line 42
  After "therein" insert -- and also including a second set of torsion rod apertures --.

Column 9, line 35
  Delete "dispose" and insert therefor -- disposed --.

Column 9, line 44
  After "journal" delete "and a first set of torsion rod apertures".

Column 10, line 21
  "center torque" should be -- counter torque --.

Column 10, line 26
  Delete "cartridge" and insert therefor -- device --.

Column 10, line 29
  "2000 F." should be -- 2000° F. --.

UNITED STATES PATENT AND TRADEMARK OFFICE
CERTIFICATE OF CORRECTION

PATENT NO. : 5,163,701

DATED : November 17, 1992

INVENTOR(S) : John D. Cromley, Jr.

It is certified that error appears in the above-identified patent and that said Letters Patent is hereby corrected as shown below:

Column 10, line 55
 "preimetral" should be -- perimetral --.

Signed and Sealed this

Second Day of November, 1993

Attest:

BRUCE LEHMAN

*Attesting Officer*     *Commissioner of Patents and Trademarks*